May 19, 1959 — A. A. LINKOGEL — 2,887,075
SPRIG PLANTER
Filed March 4, 1957
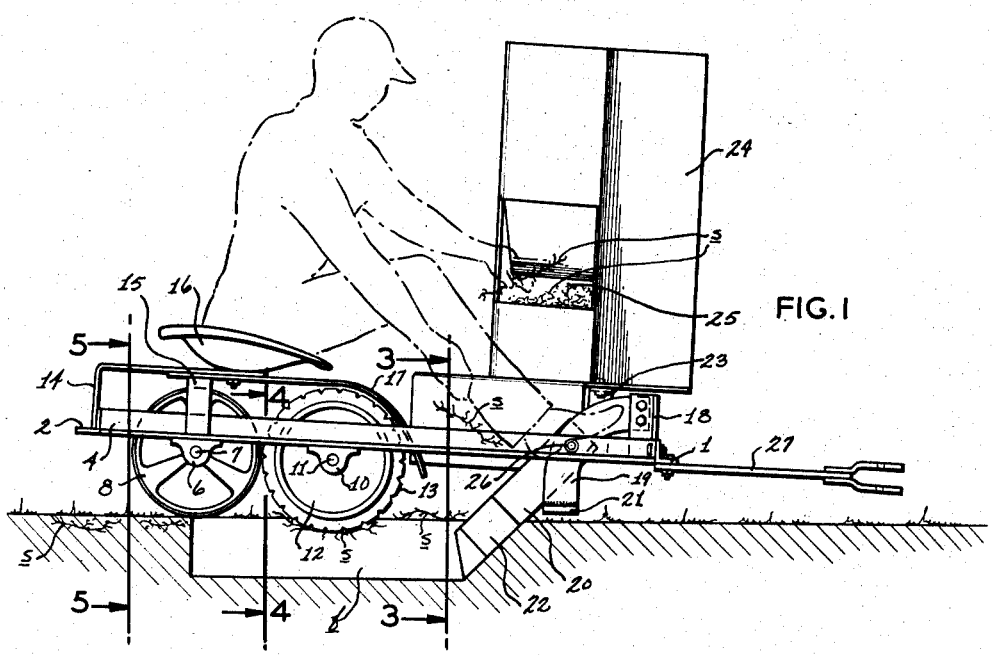
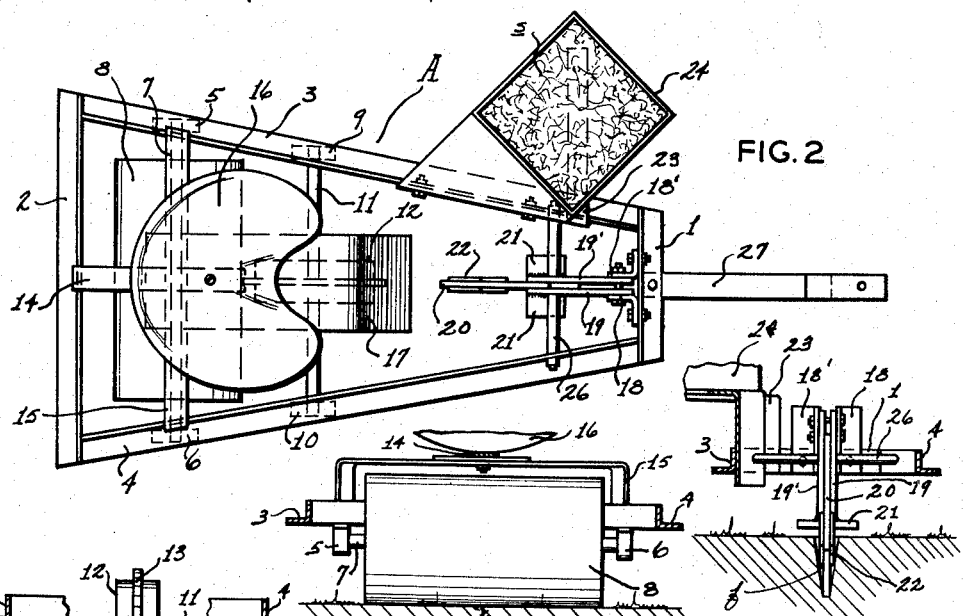
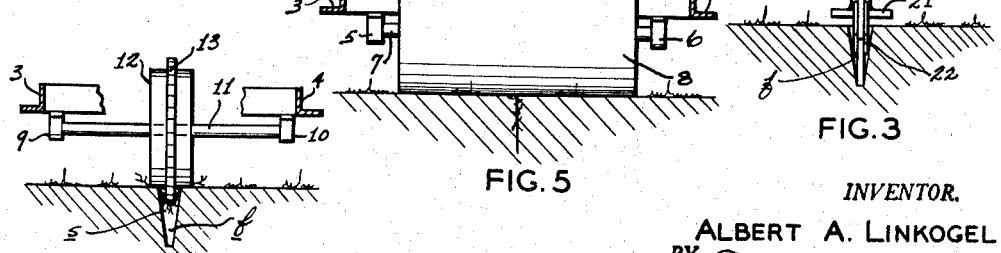
INVENTOR.
ALBERT A. LINKOGEL
BY Ralph N. Kalish
ATTORNEY

United States Patent Office 2,887,075
Patented May 19, 1959

2,887,075

SPRIG PLANTER

Albert A. Linkogel, Creve Coeur, Mo.

Application March 4, 1957, Serial No. 643,872

1 Claim. (Cl. 111—3)

This invention relates in general to grass planting, and, more particularly, to a device for the planting of grass stolons or sprigs.

Although grasses, such as Bermuda grass, for playing surfaces, lawns, and like expanses may be propagated by seeds, customarily, stolons, or, as is more commonly called, sprigs, are used, which are strong, flat shoots or rootstock capable of varying from a few inches up to several feet in length. With seed planting there is required a preliminary preparation of the soil to provide a suitable seed bed, whereas since the use of sprigs in so-called vegetative planting does not necessitate such time consuming and costly conditioning, the latter are generally used. Techniques currently utilized for planting grass sprigs such as Bermuda on playing surfaces, for example, the fairways, tees, and greens of golf courses, cause the cutting of wide and deep furrows in the ground so that the subsequent compacting of the relatively substantial quantity of loosened, removed earth, is, perforce, incomplete with much soil remaining above the surface and providing ridges which render the surface rough and uneven and hence, unsuited, during indefinite periods, for maximum playing purposes.

Therefore, it is a primary object of the present invention to provide a planter for grass sprigs, which is adapted to effect reception of the sprig within a furrow of limited extent, and to restore the planted area to a surface-even, attractive state for immediate, maximum playing efficiency thereon.

Another object of the present invention is to provide a sprig planter adapted for towing by any suitable vehicle, or which, if desired, may incorporate independent motive means.

It is a further object of the present invention to provide a sprig planter which is of durable construction and economical to produce; which is reliable in usage; having a marked simplicity of parts so as to be resistant to breakdown; and which does not require skilled personnel in its operation.

These and other detailed objects are obtained by the structures illustrated in the accompanying drawing, in which—

Figure 1 is a side elevation of a sprig planter constructed in accordance with and embodying the present invention.

Figure 2 is a top plan view.

Figure 3 is a vertical transverse section taken on the line 3—3 of Figure 1.

Figure 4 is a vertical transverse section taken on the line 4—4 of Figure 1.

Figure 5 is a vertical transverse section taken on the line 5—5 of Figure 1.

Referring now by reference characters to the drawing which illustrates a preferred embodiment of the present invention, A generally designates a sprig planter having a main frame comprising parallel, front and back end members 1, 2, said back end member 2 being of greater extent than said front member 1 and side members 3, 4, which converge toward their forward ends; said frame members being of any suitable stock, although angle iron has been found fully satisfactory. Supported from side members 3, 4, proximate their rearward ends, are aligned pillow blocks or bearings 5, 6, respectively, within which are journaled the ends of a transversely extending shaft 7. Mounted on shaft 7 is an enlarged roller, or, what might be termed a broad rimmed wheel 8, having a smooth peripheral surface for serving as a soil compacter as well as the rearward load-bearing support for planter A. Forwardly of roller 8 on each side member 3, 4 are fixed aligned bearings or pillow blocks 9, 10, respectively, for journaling therein of a shaft 11, which carries a coulter wheel 12, having centrally of its rim a circumferential, radially extending notched or scalloped fin or projection 13, for purposes presently appearing. Disposed spacedly upwardly of roller 8 and coulter wheel 12 and bolted or otherwise fixed upon axially normal supports 14, 15 secured to the main frame, is a seat 16 for an operator; there being a curved guard plate 17 extending forwardly and thence downwardly from beneath seat 16 to prevent any inadvertent contact of the operator's legs with coulter wheel fin 13.

Secured upon the inner surface of front end member 1 is a pair of vertically disposed, parallel support arms 18, 18' upon the confronting faces of which are fixed brackets 19, 19' respectively for receiving therebetween a knife or furrow opener 20; said latter being rearwardly and downwardly inclined with its longitudinal axis at substantially 45° to the vertical so that it may be easily pulled through the ground for cutting, in a generally squeezing-like manner, a relatively fine opening and without effecting a disturbing rupture of the soil. Knife 20 is in alignment with fin 13 of coulter wheel 12 along the longitudinal median line of the main frame so that fin 13 will normally move through the furrow cut. Adjacent the lower end of knife 20 and projecting laterally of each side thereof is a stop or detent 21 welded or otherwise fixed to brackets 19, 19' for limiting the depth of penetration of knife 20 within the ground, said stops 21 being so arranged as to prevent a penetration in excess of six (6) inches. Below stops 21, on each side of the lower end of knife 20, is mounted a plate 22, the lower edge of which terminates above the lowermost edge of knife 20, for widening the upper operating portion of knife 20 so that as the latter is pulled through the ground it will cut a furrow which flares upwardly and outwardly, in V-formation, as may best be seen in Figures 3 and 4.

Disposed upon the main frame, to one side thereof and forwardly of seat 16, in any suitable manner as by direct securement, or to supports as at 23, is a container 24 for the supply of sprigs or stolons s to be planted, and having a discharge opening 25 at its lower rearward end for presenting the sprigs for convenient withdrawal by the operator. For rigidifying knife 20 in its supports is a cross rod 26 extending through aligned openings in knife 20 and brackets 19, 19' with its ends fixed to side members 3, 4. The portions of said rod 26 on either side of knife 20 serve as foot rests for the operator. Extending forwardly from front end member 1, being secured thereto as by bolts, welding, or the like, is a draw bar 27 adapted for securement to any towing vehicle.

In usage, planter A, having been coupled to a tractor or the like, is moved across the area to be planted, being preferably directed along straight paths, with rotation of roller 8 and coulter wheel 12 being effected through contact with the ground. Knife 20 will, as stated, be pulled through the ground, extending thereinto to a depth of six inches, as hereinabove determined, for cutting a furrow f which in its upper, wider portion will have a width of about one inch due to the preselected, combined thickness of plates 22 and knife 20. As planter A travels, the operator will, by hand, periodically drop sprigs *s* downwardly, just forwardly of guard plate 15, toward the newly cut furrow *f*. Since the sprigs *s* are considerably longer than the width of the narrow furrow *f* and are of such varying configuration, the same will, for the most part, fall across the mouth of furrow *f* or land in such manner as to have but a most limited portion projecting into the furrow. The area bounded by the operator's legs and guard plate 15 is delimited so that sprigs *s* dropping therethrough will fall partially across or into furrow *f*. The fin 13 of coulter wheel 12 will, through its alignment with knife 20, engage those portions of sprigs *s* lying across or within the furrow *f* and cause same to be pushed downwardly a short distance toward the base of furrow *f*, with the adjacent rim portions of coulter wheel 12 rolling over the proximate portions of sprigs *s* thereby assuring their positive disposition with respect to furrow *f* for the soil-compacting operation of roller 8. (See Figure 4).

Roller 8 following immediately upon the downward pushing of fin 13 will compact the relatively small amount of soil loosened by knife 20 so that the sprigs *s* will be planted within furrow *f* for germination. It will thus be seen that knife 20 is so adapted as to cut a narrow, shallow furrow, sufficient to receive sprigs *s* for desired grass growth, yet occasioning but minimum disturbance of the soil. Coulter wheel 12 with fin 13 reliably effects reception of portions of each sprig *s* within the furrow, while roller 8 forces the squeezed apart or loosened soil to seal or close furrow *f*, causing the ground surface to resume its natural state of level, as existed prior to the planting operation.

With currently used planters for sprigs relatively deep, wide furrows are cut with so much soil being disturbed and cast laterally beyond the sides of the furrows that the compacting means cannot bring about a refilling of the furrow so as to restore the surface to desired and natural evenness, but does cause the creation of ridges so that the ground subsequent to the planting operation is in a rough, uneven state and hence not amenable for proper playing thereon, as in the case of golf courses. With the present invention, as brought out hereinabove, the ground is returned to a condition of normal level so that immediately subsequent to the sprig planting by the use of planter A the surface is just as playable as prior to the operation. Furthermore, from an appearance standpoint it will be observed that the planting surface retains its customary sightliness, unmarred by any ridges, or the like.

Although it does not form a part of the present invention, it is to be recognized that a conventional fertilizing unit could be easily mounted upon the main frame and adapted for the discharge of fertilizer in a predetermined manner, through suitable gearing, sprocket wheels, and sprockets, driven by roller-carrying shaft 7.

Planter A, as shown, is of simple, yet highly durable construction, resistant to breakdown, and having a marked simplicity of parts so that repair or replacement can be expeditiously accomplished. Furthermore, it is to be noted that planter A through its connection to the towing vehicle, as a tractor, will pivot about its point of attachment thereto so that it will ride smoothly over the terrain regardless of the surface contour thereof.

It should be understood that changes and modifications in the formation, construction, arrangement, and combination of the several parts of the sprig planter may be made and substituted for those herein shown and described without departing from the nature and principle of my invention.

Having thus described my invention, what I claim and desire to secure by Letters Patent is:

A sprig planter comprising a main frame, a soil-compacting roller rotatably mounted at the normally rearward end of said frame, a wheel rotatably mounted on said frame forwardly of said roller, said wheel having a rim, a radially projecting, circumferentially extending, notched fin provided centrally of the peripheral surface of said rim, the diameter of said fin being greater than the diameter of said roller, a flat furrow-opening knife having an inclined lower edge provided forwardly of said wheel, means for supporting said knife on said main frame, said knife being presented with its longitudinal axis at an angle of substantially 45 degrees to the vertical, and being rearwardly and downwardly inclined, said knife extending downwardly below the fin of said wheel, a plate mounted on each side of said knife upwardly of its lower extremity for widening the upper portion of the furrow cut by the knife whereby said furrow will be of V-shape in cross-section, the rim of said wheel having a width greater than the upper portion of the furrow cut by said knife and said plates, the extent of projection of said fin from said wheel being less than the depth of the furrow cut by said knife, a container for a supply of sprigs mounted on the forward portion of said main frame forwardly of said wheel and said roller, and a seat provided upwardly and above said roller and said wheel.

References Cited in the file of this patent

UNITED STATES PATENTS

| | | |
|---|---|---|
| 315,799 | Law | Apr. 14, 1885 |
| 1,951,061 | Orlow | Mar. 13, 1934 |
| 2,674,212 | Callaham et al. | Apr. 6, 1954 |
| 2,715,882 | Overstreet | Aug. 23, 1955 |